(No Model.) 2 Sheets—Sheet 2.
J. ARNOLD.
AGRICULTURAL IMPLEMENT.
No. 419,027. Patented Jan. 7, 1890.
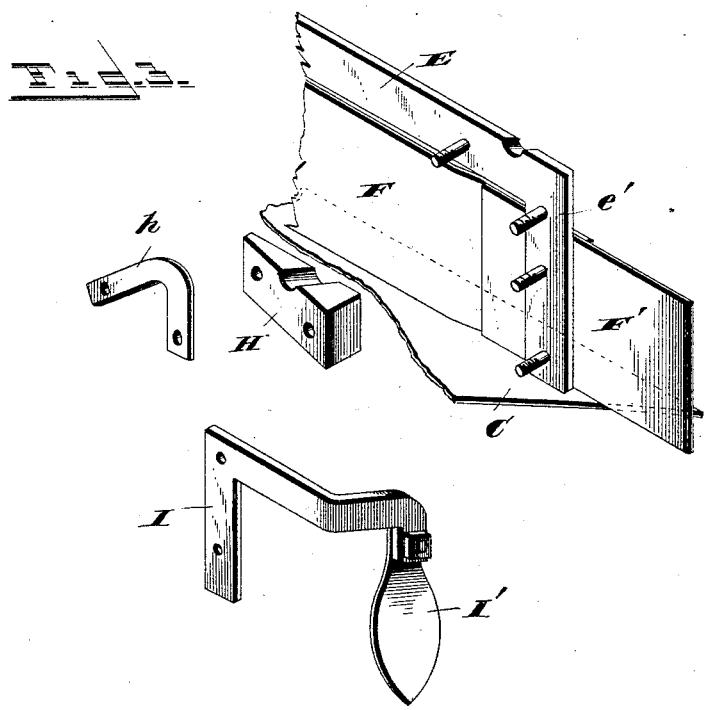
WITNESSES
John Arnold.
INVENTOR
by
Attorney

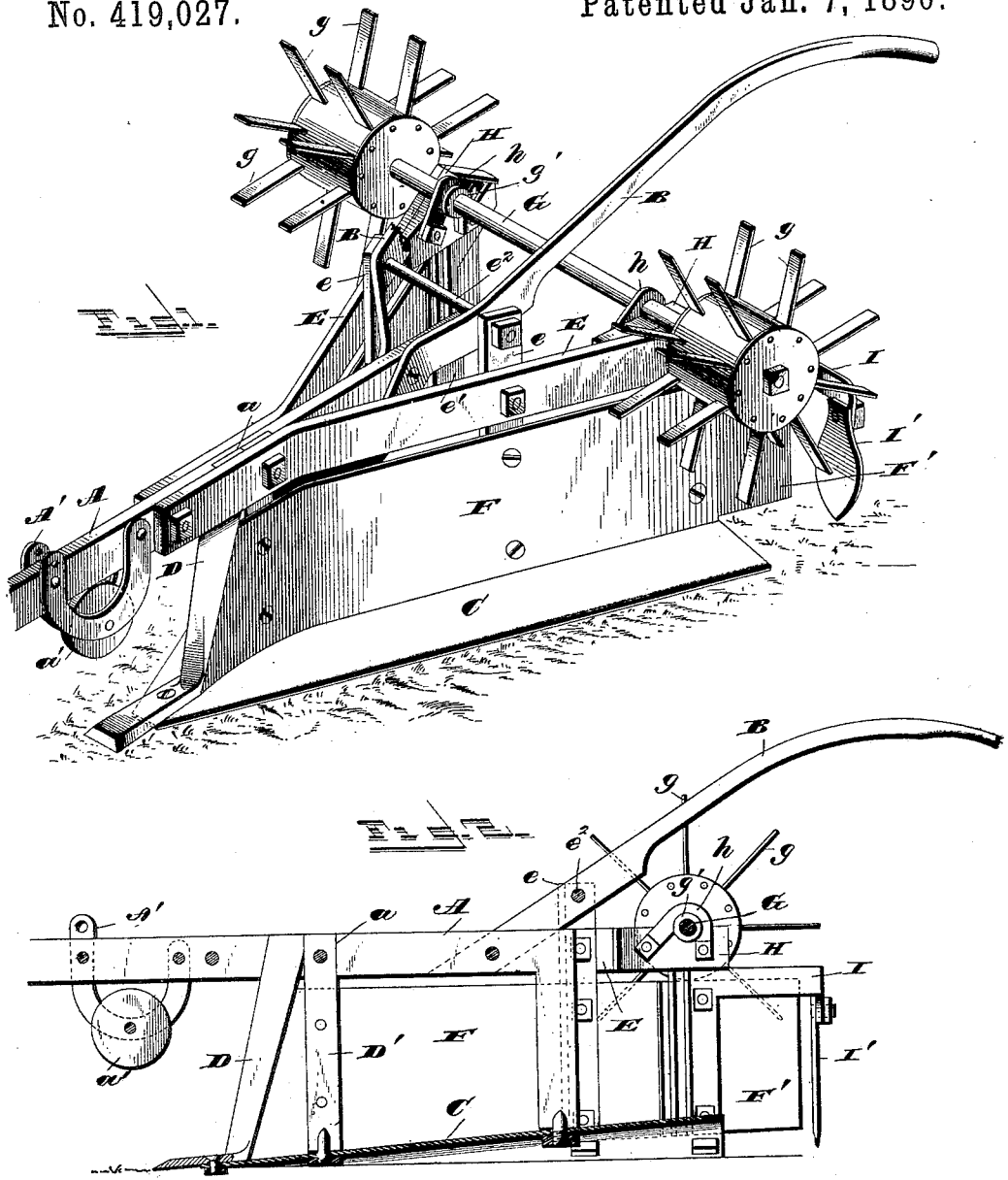

UNITED STATES PATENT OFFICE.

JOHN ARNOLD, OF FORTY FORT, PENNSYLVANIA.

AGRICULTURAL IMPLEMENT.

SPECIFICATION forming part of Letters Patent No. 419,027, dated January 7, 1890.

Application filed February 28, 1889. Serial No. 301,483. (No model.)

*To all whom it may concern:*

Be it known that I, JOHN ARNOLD, a citizen of the United States of America, residing at Forty Fort, in the county of Luzerne and State of Pennsylvania, have invented certain new and useful Improvements in Agricultural Implements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in agricultural implements, the object of my invention being to provide an implement which may be used as a plow or cultivator, and which is so constructed that by addition of certain attachments it may be employed to hill up ground adjacent to such plants as potatoes or corn, and be also used to dig potatoes; and my invention consists more especially in the construction and combination of the parts, as will be hereinafter fully set forth, and specifically pointed out in the claims.

In the accompanying drawings, Figure 1 is a perspective view of my improved agricultural implement, showing all the attachments applied thereto. Fig. 2 is a longitudinal section. Fig. 3 is a detail view showing some of the parts separated.

In carrying out my invention I employ an essentially-rigid frame composed of the central horizontal beam A and rearwardly-diverging beams E E, which are bolted at their forward ends to the beam A. The forward end of the beam A is formed into a clevis for the attachment of the draft, and near the rear end are attached the handles B. In rear of the point of attachment of the handles the beam A is bent downwardly and the end thereof formed into a threaded bolt, which passes through the bottom plate C and is secured by a nut. A U-shaped frame A' is pivoted at its rear end to the beam A, and is adjustably connected at its forward end to the beam by means of a suitable pin. The lower portion of this frame has mounted therein a colter $a'$. The central beam A is cut away at $a$ for the reception of the reduced upper ends of the share D and standard D'. The plowshare D is sharpened at its front edge, and its lower end is bent forwardly and provided with beveled edges, as shown. This plow-point is bolted to the forward end of the bottom plate C.

To the central or main beam A are rigidly secured the diverging beams E E, to which are secured standards $e$ and $e'$, which have formed on their lower ends bolts with which nuts engage for securing the curved plate or share C. Instead of the rear standards being bolted to the diverging beams E E, they may be formed integral therewith by having the ends of said beams bent downwardly. The standards $e$ extend upwardly beyond the diverging beams E E, and their upper ends are perforated for the reception of a cross-bar $e^2$, which also passes through the handles and holds them rigidly at the proper incline. The rear ends of the beams E E are cut away to provide concave recesses for the reception of a shaft, and on each side of these recesses the beams E are perforated, so that bolts may pass therethrough for securing in place such attachments as may be desired.

To the standards D' and $e$ are rigidly attached, by means of bolts or rivets, mold-boards F, which at their forward ends abut against the rear edge of the plowshare D and diverge slightly therefrom. The bottom plate C extends beyond the mold-boards F, and is curved upwardly in cross-section, so that the edges thereof will only contact with the ground.

The implement thus far described is made entirely of metal, and may be employed either as a ditching-plow or cultivator to throw the earth on each side, or into hills when used in cultivating potatoes or corn.

The diverging bottom plate C will prevent the implement rising out of the ground, and by properly adjusting the colter $a'$ the implement can be made to enter the ground to any desired depth.

When it is desired to further pulverize the earth, to the rigid frame I attach a transverse shaft G, the ends of which are provided with hubs with radiating spokes or arms $g$. This shaft is elevated, so as to be free to rotate, and lateral movement is prevented by collars $g'$, which will abut against the bent straps which hold it in position upon the diverging beams E. Angular blocks H may be inserted between the diverging beams E, so that the bent straps $h$ will be parallel with the line of draft and form straight surfaces, against which the rollers $g'$ will bear.

As the mold-boards F throw the earth to one side, it will be pulverized and thoroughly separated by the arms or spokes $g$. When it is desired, the mold-boards may be extended by adding extension-plates F', secured in place by means of bolts and nuts.

I refers to a bent arm secured to the inner side of the standard $e'$ and provided with an extended end for the support of a shovel or cultivator-blade I'. This attachment is intended to be used in connection with the hereinbefore-described device when it is desired to cultivate the ground and separate it farther than it is separated by the mold-boards.

When it is desired to use the implement to hill-up potatoes or corn, the extensions F' and the mold-boards are fastened in place; and by securing or detaching the devices hereinbefore described the implement may be used for several separate and distinct purposes—viz., as a plow, and by the attachment of the cultivator-shovels I' as a cultivator. By removing the extensions the device may be used to hill-up potatoes or corn. When the shafts with the arms or diggers is attached to the device without the extension mold-boards or cultivators, the implement may be used as a potato-digger.

Having thus described my invention, what I claim as new, and desire to secure by Letters Patent, is—

1. The combination, in an agricultural implement for the purpose set forth, of a rigid frame provided with handles and vertical standards, mold-boards rigidly secured to said standards, and a bottom plate curved in cross-section, said bottom plate extending beyond the mold-boards F F and forward of the same, a plowshare D, having its lower end bent forwardly to provide a point, and secured to the frame and to the forward end of the plate C, substantially as shown, and for the purpose set forth.

2. The combination, in an agricultural implement, of a frame consisting of a central beam A, diverging beams E, vertical standards formed integral with said beams or attached thereto, the lower ends of said standards being formed into bolts for connecting thereto a bottom plate C, and vertical mold-boards secured to said standards within the side edges of the bottom plates, substantially as shown.

3. The combination, with an agricultural implement constructed substantially as shown and consisting of a rigid frame carrying vertical diverging mold-boards F F, and a bottom plate C, curved upwardly transversely, so that the outer edges will extend beyond the mold-boards, of the share D, having its lower end bent forwardly, substantially as shown, and for the purpose set forth.

4. In combination with a rigid frame provided with handles, mold-boards F and F, a bottom plate C, all of said parts being rigidly attached to the component parts of the frame, as described, a rear standard provided with perforations and removable bolts, whereby the ends of the mold-boards may be loosened, and extensions F', placed between said standard and the permanent mold-board and secured in place, substantially as and for the purpose set forth.

5. The combination, with a frame, vertical mold-boards and bottom plate C, angular bearing-blocks, and loops or bails, of a shaft G, provided with collars $g'$, for preventing lateral movement thereof, the outer ends of said shaft being provided with hubs with radial arms, substantially as shown, and for the purpose set forth.

In testimony whereof I affix my signature in presence of two witnesses.

JOHN ARNOLD.

Witnesses:
   J. G. ECKERT,
   C. T. ARNOLD.